United States Patent

Low et al.

[15] 3,705,255

[45] Dec. 5, 1972

[54] HERMETICALLY SEALED SEMICONDUCTOR

[72] Inventors: George M. Low, Deputy Administrator of the National Aeronautics and Space Administration with respect to an invention of; David S. Jacobson, Plainfield, N.J.

[22] Filed: Oct. 27, 1970

[21] Appl. No.: 84,289

[52] U.S. Cl. ......................174/52 S, 29/589, 29/591, 317/234 A, 317/234 G

[51] Int. Cl. ..............................................H05k 5/00

[58] Field of Search.......174/50.5, 50.54, 525, 50.61; 317/234 G, 234 H; 29/588–591

[56] References Cited

UNITED STATES PATENTS

| | | | |
|---|---|---|---|
| 3,310,717 | 3/1967 | Hargasser et al | 317/234 G UX |
| 3,457,472 | 7/1969 | Mulski | 317/234 G UX |
| 3,515,952 | 6/1970 | Robinson | 317/234 G UX |

*Primary Examiner*—Darrell L. Clay
*Attorney*—R. F. Kempf, G. M. Fisher and John R. Manning

[57] ABSTRACT

A hermetically sealed coaxial package suitable for housing microwave semiconductor components is described. The package comprises a collector stud having a flange intermediate the ends of the stud. One end of the stud is generally conically formed and has a flat top or plateau upon which the semiconductor component is mounted. An insulating ring is mounted on one surface of the flange around the conical end of the stud. An electrically conductive washer is mounted on the other side of the insulating ring so that it is adjacent the flat top of the conical end of the collector stud. Located above the metallic washer is an insulating washer and located above the insulating washer is a metallic cap. The stud, the electrically conductive washer, and the cap form the external connections to the semiconductor component.

6 Claims, 2 Drawing Figures

INVENTOR
DAVID S. JACOBSON

BY Gerald M. Fisher
ATTORNEYS

HERMETICALLY SEALED SEMICONDUCTOR

ORIGIN OF THE INVENTION

The invention described herein was made in the performance of work under a NASA contract and is subject to the provisions of Section 305 of the National Aeronautics Space Act of 1958, Public Law 85-568 (72 stat. 435; 42 U.S.C. 2457).

BACKGROUND OF THE INVENTION

This invention relates to semiconductor packages and more particularly to hermetically sealed coaxial semiconductor packages suitable for housing microwave semiconductor components.

Various types of semiconductor packages have been proposed and are in use. Many of these packages hermetically seal semiconductor components from the surrounding environment. While these packages have been reasonably satisfactory when used with semiconductor components that operate at relatively low frequency and low power levels, they are unsatisfactory for use with components that operate at relatively high frequency and high power levels. In other words, for example, these packages are unsatisfactory for housing semiconductor transistors that generate high power at microwave frequencies. The primary reason that many of these packages are unsatisfactory is that undesirable levels of degenerative inductive and capacitive reactances occur between the parts forming the terminals of the overall structure. In addition, many of them do not have the mechanical strength required for applications in relatively rugged atmospheres, such as in the vacuum of space. Moreover, many of them are specially designed whereby they are not suitable for use in various types of different circuits such as coaxial, stripline and microstriplines.

Therefore, it is an object of this invention to provide a new and improved semiconductor package.

It is another object of this invention to provide a new and improved hermetically sealed coaxial semiconductor package that has low degenerative inductive and capacitive reactances.

It is a still further object of this invention to provide a new and improved hermetically sealed coaxial semiconductor package that has low degenerative inductive and capacitive reactances, excellent mechanical strength and is useful in coaxial and other, different types of, circuits.

SUMMARY OF THE INVENTION

In accordance with principles of this invention a hermetically sealed coaxial semiconductor package suitable for housing a high frequency, high power semiconductor component is provided. The package comprises an electrically conductive stud having one end that is generally cylindrical in shape and another end that is generally conical in shape. A cylindrical flange extends outwardly from a point between the cylindrical and conical ends of the stud. The conical tip is flat whereby a plateau is formed upon which a semiconductor component is mounted. Mounted on the flange about the conical end of the stud is an insulating ring and mounted on the other side of the insulating ring is an electrically conductive washer which is adjacent the plateau tip of the conical end of the stud. Located on the other side of the electrically conductive washer is an insulating washer and located on the other side of the insulating washer is a cap. The cap is formed of a suitable electrically conductive material. The stud, the washer and the cap form the external terminals and are connected to the semiconductor component.

In accordance with further principles of this invention, the stud, the electrically conductive washer, and the cap are all formed of either silver or copper. In addition, the insulating ring is formed of beryllium oxide (BeO) and the insulating washer is formed of alumina. Moreover, a first pair of leads are connected between the semiconductor component and the cap, and a second pair of leads are connected between the semiconductor component and the electrically conductive washer. Finally, the BeO insulating ring is metalized on both flat surfaces with moly manganese and plated with nickel and the alumina insulating washer is metalized on both flat surfaces with moly manganese plated with gold.

In accordance with still further principles of this invention, a subassembly comprising the stud, the BeO insulating ring, the conductive washer and the insulating washer are brazed together in a high temperature furnace (800°–900° C). The semiconductor component is then mounted on the flat conical tip of the stud. Bond connections are then made from the semiconductor component to the conductive washer and the insultaing washer. Finally, a braze ring is inserted between the cap and the insulating washer. Thereafter, the overall structure is placed in a die mounter and the cap is brazed to the insulating washer to hermetically seal the entire assembly.

It will be appreciated from the foregoing brief summary of the invention that a hermetically sealed coaxial transistor package is provided by the invention. By assembling the elements in the manner indicated, a structure that exhibits excellent mechanical strength and is suitable for use in coaxial circuits is provided. The package is also readily adaptable to stripline or microstripline circuitry. Moreover, it has low degenerative inductive and capacitive reactances whereby it is suitable for use with high frequency, high power semiconductor structures such as transistors that operate in the Gigahertz range at several watts. Reduced degenerative inductance is provided because pairs of leads are used. Further, low degenerative capacitance is provided because the invention has low feed through capacitance. Moreover, high thermal dissipation occurs because a thermal path exists through the insulating ring as well as through the stud.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
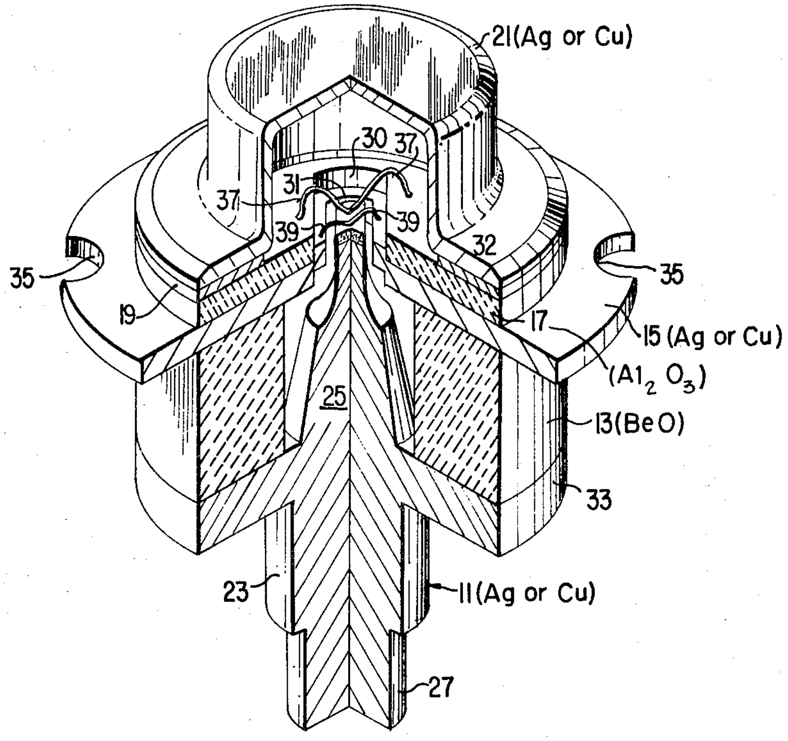
FIG. 1 is a perspective view of a hermetically sealed semiconductor package formed in accordance with the invention; and, FIG. 2 is a schematic diagram illustrating the various degenerative inductive and capacitive reactances associated with the structure illustrated in FIG. 1.

FIG. 1 illustrates a preferred embodiment of the invention that comprises a stud 11; an insulating ring 13; an electrically conductive washer 15; an insulating washer 17; a braze ring 19; and, a cap 21.

The stud 11 is cylindrically shaped on one end 23 and conically shaped on the other end 25. The cylindrical end is undercut along a region 27 adjacent the outer tip. The conical end 25 ends in a blade shaped outer tip 29. The blade shaped outer tip 29 ends in a plateau upon which a semiconductor component 31 is mounted. The hub 11 also includes a flange 33 located intermediate the cylindrically shaped end 23 and the conically shaped end 25. Mounted on the flange 33 about the conical end 25 is the insulating ring 13. The insulating ring ends in a plane that intersects the blade portion of the conically shaped end 25.

The electrically conductive washer 15 is mounted on the other surface of the insulator ring 13. The electrically conductive washer 15 has a slotted aperture 30 at its center which fits about the blade shaped end 29 of the stud 11, but is separated therefrom. In addition, the electrically conductive washer 15 has a pair of oppositely located semicylindrical apertures 35 in its periphery. The semicylindrical apertures allow the overall structure to be bolted in place, if desired.

Located on the other surface of the electrically conductive washer 15 is the insulating washer 17. The insulating washer 17 also has a slotted aperture located at its center which fits about a raised region 32 formed above and around the slot in the electrically conductive washer 15. Located on the other side of the insulating washer 17 is the braze ring 19. TIn essence, the braze ring is flat washer shaped and has a circular inner aperture that is considerably larger than the slotted aperture in the insulating washer. Located on the other side of the braze ring 19 is the cap 21. The cap 21 is in the form of a hat having a brim that rests on the other surface of the braze ring 19.

Preferably, the stud 11 is formed of silver or copper as are the electrically conductive washer 15 and the cap 21. The insulating ring 13 is preferably formed of beryllium oxide (BeO) and the insulating washer 17 is formed of alumina. Moreover, the BeO insulator ring is metalized with moly manganese on both of its metal joining surfaces. The moly manganese is plated with nickel. The alumina insulator is also metalized on both metal contacting surfaces with moly manganese. However, this moly manganese is, preferably, plated with gold.

The foregoing elements are attached in the following manner. A subassembly comprising the stud, the BeO insulating ring, the conductive washer and the insulating washer is formed by mounting these items in the illustrated manner and brazing them together in a high temperature furnace (800–900° C). The semiconductor component is then mounted on the flat conical tip of the stud and connections (described below) are made from the semiconductor component to the conductive washer and the metalized upper surface of the insulating washer. Thereafter, the braze ring and the cap are mounted in the indicated manner. The overall structure is then placed in a die mounter and cap is brazed to the insulating washer to hermetically seal the entire assembly. The thusly formed structure exhibits excellent mechanical strength which, due to its structural formation is particularily useful in coaxial circuits. However, the invention is not limited to use in coaxial circuits, it is also useful in stripline and microstripline circuits.

Figure 2:
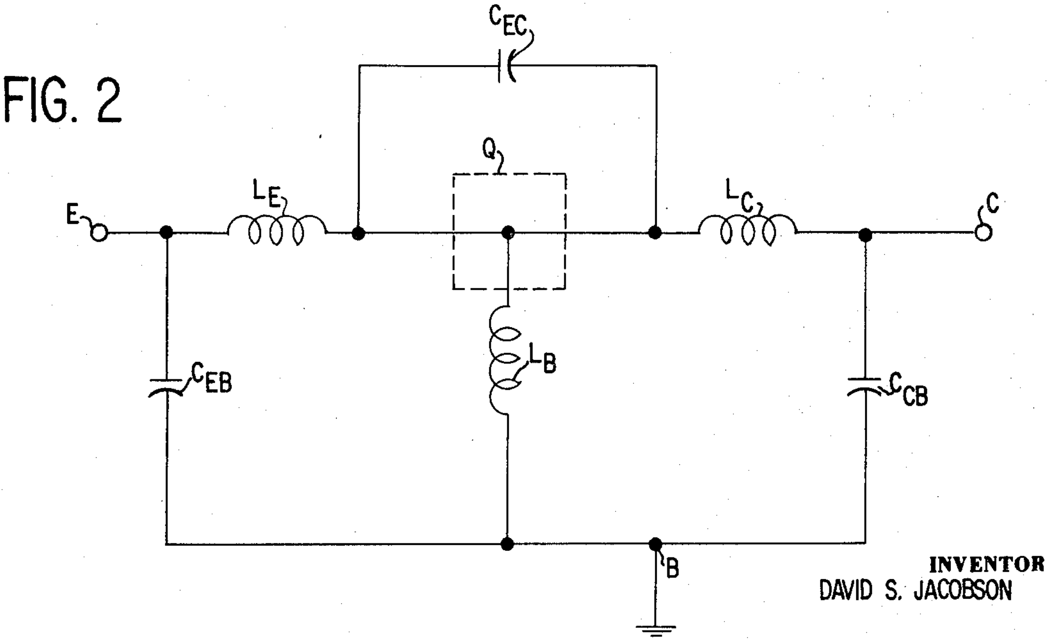

In addition to having high mechanical strength, the invention also exhibits low degenerative inductive and capacitive reactances. More specifically, FIG. 2 illustrates the inductive and capacitive reactances of the overall package when the semiconductor component is a high frequency, high power transistor. That is, when the package houses a transistor that operates in the Gigahertz range at several watts, a schematic circuit of the type illustrated in FIG. 2 can be drawn to represent the inductive and capacitive reactances of the package.

FIG. 2 illustrates a transistor designated Q. The emitter terminal of the transistor is connected by a first pair of wires 37 (FIG. 1) separated by 180° to the metalized surface of the insulator washer 17 whereby it is connected to the cap 21. Hence, the cap 21 forms the external emitter connection (E of FIG. 2) for the overall structure. A second pair of wires 39 (FIG. 1) separated by 180° connect the base of the transistor Q to the electrically conductive washer 15 whereby the electrically conductive washer comprises the external base connection (B of FIG. 2) to the transistor. The stud 11 forms the remaining (collector) connection (E of FIG. 2).

FIG. 2 also illustrates the degenerative inductive and capacitive reactances of the semiconductor package that are formed between the actual transistor and the various connection points. More specifically, the capacitive reactance between the emitter and collector terminals of Q is designated $C_{EC}$, the capacitive reactance between the emitter and base connection points (E and B) is designated $C_{EB}$ and the capacitive reactance between the collector and base connection points (C and B) is designated $C_{CB}$.

The inductive reactances between the emitter, base and collector terminals of Q and the emitter, base and collector connection points (E, B and C) are designated $L_E$, $L_B$, and $L_C$, respectively. More specifically, $L_E$ is illustrated as connected between the cap or point E and the emitter terminal of Q, $L_C$ is illustrated as being connected between the stud or point C and the collector terminal of Q and $L_B$ is illustrated as connected between the electrically conductive washer or point B and the base terminal of Q. It will be appreciated by those skilled in the art and others that the schematic diagram illustrated in FIG. 2 is the conventional diagram used to illustrate the degenerative inductive and capacitive reactances related to a semiconductor package. It has been determined that the following degenerative inductive and capacitive values can be obtained for a package of the type herein described:

$L_B = 0.1$nH;
$L_E = 0.2$nH;
$L_C = 1.0$nH;
$C_{EB} = 3.9$pF (when the collector is floating);
$C_{CB} = 1.0$pF (when the emitter is floating); and
$C_{EC} = 0.5$pF (when the base is floating.

It will be also appreciated by those skilled in the art and others that the foregoing values are considerably lower than are the values of degenerative inductive and capacitive values for prior art hermetically sealed semiconductor packages. It is this improved reduction in degenerative inductive and capacitive reactances that allows the invention to be used with semiconductor components that operate at high frequency and high power levels.

It will be appreciated from the foregoing description that a semiconductor package that is basically coaxial in shape and hermetically sealed is provided by the invention. The semiconductor package can be utilized to house transistors or other semiconductor components that operate at high frequency and high power levels. In addition, because the package is mechanically rugged, it can be used in various environments, including the remote vacuum environment of space. The hermetically sealed coaxial package contributes to the stability of the semiconductor component, particularily when the semiconductor component is a transistor operating as an extremely high frequency and high temperature amplifier. More particularly, for bandwidth and stability considerations, the inventive package has low common lead inductance (base leads), a low feed through capacitance, and high thermal dissipation properties. By minimizing the distances between the flange (conductive washer) and the component (25 mils) and by using dual bonding (two leads for each tab) placed 180° apart, mutual inductance is reduced, resulting in lower lead inductances. Further, by interposing a flange or conductive washer (at ground potential) between the input and output (emitter and collector), RF shielding is accomplished which provides lower feed through capacitance. In addition, the use of a BeO insulator ring between the flange and the stud allows both the flange and the stud to heat sink the semiconductor component. Finally, by forming the stud, the flange and the cap out of solid silver reduces series resistance losses while increasing thermal dissipation capacity.

While a preferred embodiment of the invention has been illustrated and described, it is to be understood that various changes can be made therein without departing from the scope of the invention. For example, rather than being blade shaped, that end of the stud can be terminate in a circular plateau formed in the tip of a conic. For such a structure, the apertures in the electrically conductive washer and insulating washer will be cylindrical rather than slot shaped. Hence, the invention can be practiced otherwise than as specifically described herein.

I claim:

1. A hermetically sealed coaxial transistor device capable of operating in the Gigahertz frequency range with a power rating of several watts comprising a metal stud forming a transistor collector terminal, said stud having a flange with a metal face intermediate its ends, an insulating ring having first and second metallized faces, the first metallized face contacting and being bonded to the metal face of the flange, a metal washer forming a first transistor electrode terminal and having a first metal face contacting and being bonded to the second metallized face, said metal washer having an outer diameter greater than any other component of the transistor device to form an electric shield between parts at opposite ends of the transistor device, an insulating washer having third and fourth metallized faces, said third face contacting and being bonded to a second metal face of the metal washer, said fourth face being electrically connected by a braze ring to a metal flange of a metal cap forming a second transistor terminal, said braze ring having faces bonded to the fourth face and the metal flange of the cap, said bonded faces forming a hermetically sealed cavity between the face of the flange and a face of the cap and within each of the insulating ring, metal washer, insulating washer, braze ring, and cap, said stud terminating in the cavity in a plateau proximate the intersection of the washers, a semiconductor component mounted on said plateau of said stud, said component including a collector region on one side thereof, said collector region abutting against the plateau in electrical and mechanical contact with said plateau, the opposite side of said component including base and emitter regions, a first pair of lead wires extending 180° in opposite directions from one of the regions to one face of the metal washer, and a second pair of lead wires extending 180° in opposite directions from the other region to the fourth metallized face.

2. The device claimed in claim 1 wherein said one end of said stud has a generally conically shaped end, said conically shaped end terminating in said plateau.

3. The device of claim 2 wherein said insulating ring is formed of beryllium oxide and said insulating washer is formed of alumina.

4. The device of claim 3 wherein the conically shaped end of said stud terminates in a blade shaped tip having a flat surface in a plane running in the same direction as the longitudinal axis of the coaxial device; and, wherein said insulating washer and said metal washer have slots which surround said blade shaped tip, but are separate therefrom.

5. The device of claim 1 wherein said one end of said stud terminates in a blade shaped tip having a flat surface in a plane running in the same direction as the longitudinal axis of the coaxial device; and, wherein said insulating washer and said metal washer have slots which surround said blade shaped tip, but are separate therefrom.

6. A hermetically sealed coaxial transistor device capable of operating in the Gigahertz frequency range with a power rating of several watts comprising a metal stud forming a transistor collector terminal, said stud having a flange with a metal face intermediate its ends, an insulating ring having first and second faces, the first face contacting and being bonded to the metal face of the flange, a metal washer forming a first transistor electrode terminal and having a first metal face contacting and being bonded to the second face, said metal washer having an outer diameter greater than any other component of the transistor device to form an electric shield between parts at opposite ends of the transistor device, an insulating washer having third and fourth faces, said third face contacting and being bonded to a second metal face of the metal washer, said fourth face having a metallized surface electrically connected to a metal flange of a metal cap forming a second transistor terminal, said bonded faces forming a hermetically sealed cavity between the face of the flange and a face of the cap and within each of the insulating ring, metal washer, insulating washer, and cap, said stud terminating in the cavity in a plateau proximate the intersection of the washers, a semiconductor component mounted on said plateau of said stud, said component including a collector region on one planar surface thereof, said collector region abutting against the plateau in electrical and mechanical contact with said plateau, the opposite side of said component including base and emitter regions, a first pair of lead wires extending 180° in opposite directions from substantially one point on one of the regions to one face of the metal washer, and a second pair of lead wires extending 180° in opposite directions from substantially one point on the other region to the metallized surface.

* * * * *